(12) United States Patent
Kobayashi et al.

(10) Patent No.: US 7,043,822 B2
(45) Date of Patent: May 16, 2006

(54) METHOD OF MANUFACTURING COMMUTATOR OF ROTARY ELECTRIC MACHINE

(75) Inventors: Masayuki Kobayashi, Kasugai (JP); Eiji Iwanari, Chiryu (JP)

(73) Assignee: Denso Corporation, (JP)

( * ) Notice: Subject to any disclaimer, the term of this patent is extended or adjusted under 35 U.S.C. 154(b) by 0 days.

(21) Appl. No.: 10/849,577

(22) Filed: May 20, 2004

(65) Prior Publication Data

US 2004/0232798 A1 Nov. 25, 2004

(30) Foreign Application Priority Data

May 21, 2003 (JP) .............................. 2003-143163

(51) Int. Cl.
*H01R 43/06* (2006.01)
*H01R 43/10* (2006.01)

(52) U.S. Cl. ............................. 29/597; 29/596; 29/598; 29/840; 29/DIG. 12; 29/DIG. 29; 228/903; 310/233; 310/236; 310/237

(58) Field of Classification Search .................. 29/597, 29/596, 598, 840, DIG. 12, DIG. 29; 228/903; 310/233, 236, 237
See application file for complete search history.

(56) References Cited

U.S. PATENT DOCUMENTS

| 4,783,906 A | * | 11/1988 | Gingerich et al. ............. 29/827 |
| 5,552,652 A | * | 9/1996 | Shimoyama et al. ....... 310/237 |
| 5,677,588 A | * | 10/1997 | Strobl ........................ 310/237 |
| 5,932,949 A | * | 8/1999 | Ziegler et al. ............... 310/236 |
| 6,114,791 A | | 9/2000 | Ito et al. |
| 6,541,889 B1 | | 4/2003 | Moroto et al. |

* cited by examiner

*Primary Examiner*—A. Dexter Tugbang
*Assistant Examiner*—Tim Phan
(74) *Attorney, Agent, or Firm*—Nixon & Vanderhye PC

(57) ABSTRACT

A method of manufacturing a commutator of a rotary electric machine includes a step of forming a first unitary material having nail portions, a step of forming a second unitary material for the commutator segments, a step of fixing the first unitary material and the second unitary material together to form a pre-commutator unit so that the nails extend radially outward from the periphery of the pre-commutator unit, a step of inserting the pre-commutator unit between a pair of dies so that the dies hold the nails without a gap, and a step of charging liquid resinous material into the inside of the dies to mold the pre-commutator unit.

13 Claims, 9 Drawing Sheets

METHOD OF MANUFACTURING COMMUTATOR OF ROTARY ELECTRIC MACHINE

CROSS REFERENCE TO RELATED APPLICATION

The present application is based on and claims priority from Japanese Patent Application 2003-143163, filed May 21, 2003, the contents of which are incorporated herein by reference.

BACKGROUND OF THE INVENTION

1. Field of the Invention

The present invention relates to a method of manufacturing a commutator for supplying electric power to an armature winding of a rotary electric machine.

2. Description of the Related Art

JP-A-Hei-10-162923 or its counterpart U.S. Pat. No. 6,114,791 discloses a flat type commutator that is constituted of a plurality of fan shaped commutator segments circumferentially disposed on a flat insulating member.

Such a segment is usually manufactured as follows. At first, a conductive disk member is prepared, and a plurality of terminal members is welded to the disk member at equal intervals to form a commutator unit. At the next step, this commutator unit is put into a molding die, and liquid insulating material is poured into the molding die to form an insulating member fixing and insulating the commutator unit. In this step, it is difficult to prevent the insulating material from sticking to nails of the terminal members, to which armature coils of a rotary electric machine are to be respectively connected. Therefore, it is necessary to remove the insulating material from the terminal members at a subsequent step, which increases production cost.

SUMMARY OF THE INVENTION

Therefore, an object of the present invention is to provide an improved method that is free from the above-described problem.

According to a main feature of the invention, a method of manufacturing a commutator of a rotary electric machine includes a step of forming a first unitary material having flat nail portions, a step of forming a second unitary material for the commutator segments, a step of fixing the first unitary material and the second unitary material together to form a pre-commutator unit so that the nails extend radially outward from the periphery of the pre-commutator unit, a step of inserting the pre-commutator unit between a pair of dies so that the dies hold the nails without a substantial gap, and a step of charging liquid resinous material into the inside of the dies to mold the pre-commutator unit.

It is more preferable to add to the above method a step of bending the nails to stay within the periphery of the pre-commutator unit, because the nails can be readily inserted into female terminals that are connected to armature coils of a motor.

The first unitary material may includes a plurality of terminal members and a plurality of arc-shaped members respectively connecting the terminal members. In this case, a step of removing the arc-shaped members is to be added. The step of forming the first unitary material may include a step of forming terminal members that has the nails and a step of forming an intermediate connection member to be disposed between the second unitary material and the terminal members.

Another object of the invention is to provide a commutator of a rotary electric machine that is free from the above problem and can be manufactured at a lower cost.

Such a commutator includes a plurality of commutator segments disposed in a circumferential direction, a metal plate terminal unit that includes a plurality of intermediate connection members respectively disposed to be in contact with the commutator segment, a plurality of terminal members respectively disposed to be in contact with the intermediate connection member, an insulating resinous member for insulating and supporting the commutator segments and the terminal members together. With the above structure, each of the terminal members has an L-shaped nail made of a flat conductive member to be connected to one of armature coils of the rotary electric machine, and each of the L-shaped nail has a first portion extending outward in a radial direction and a second portion extending in an axial direction away from the commutator segments within a circumference of the cylindrical outer periphery of the insulating resinous member.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

A method of manufacturing a commutator of a rotary electric machine according to a preferred embodiment of the invention will be described with reference to the appended drawings.

Figure 1A:
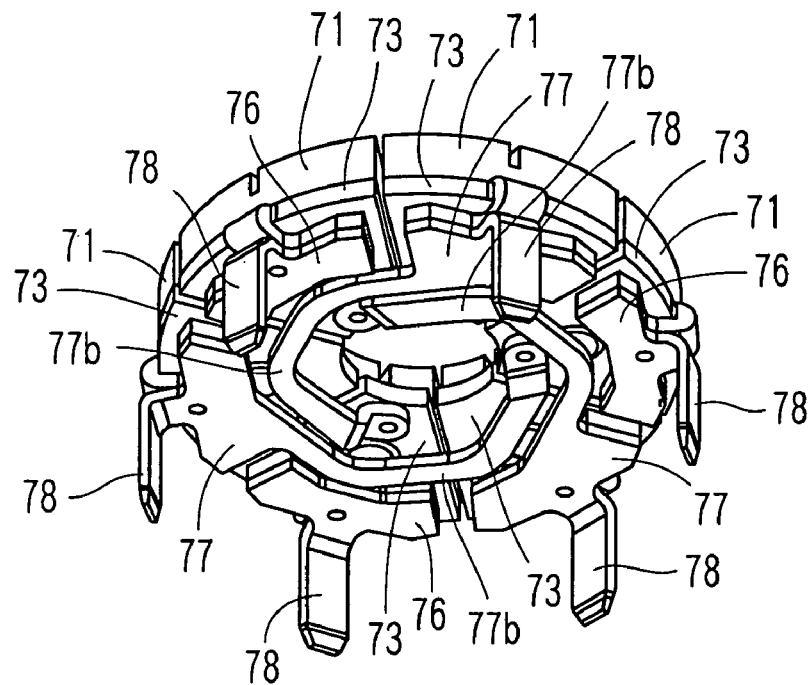
FIGS. 1A and 1B are perspective views of a pre-commutator unit before molding and a complete commutator.
Figure 1B:
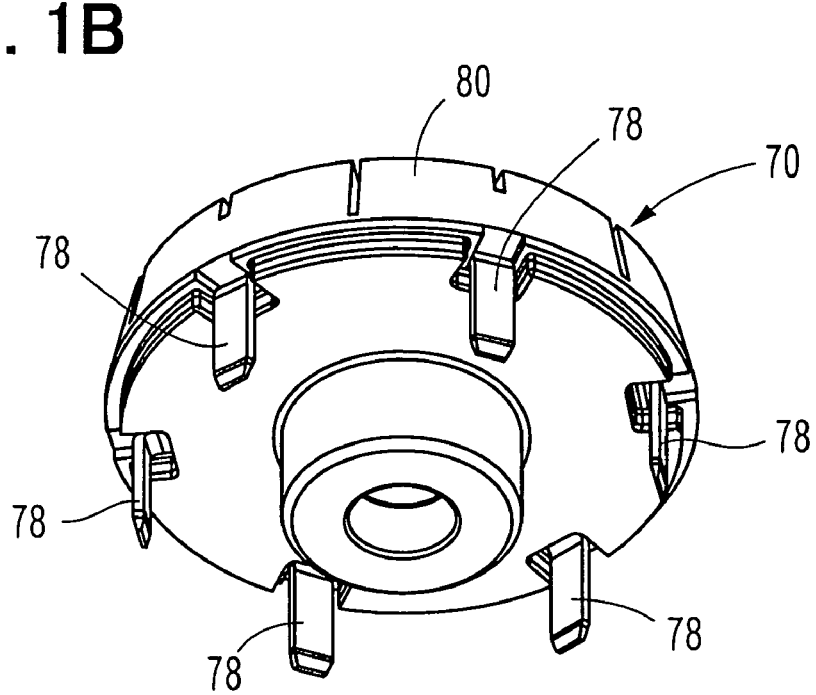
Figure 2:
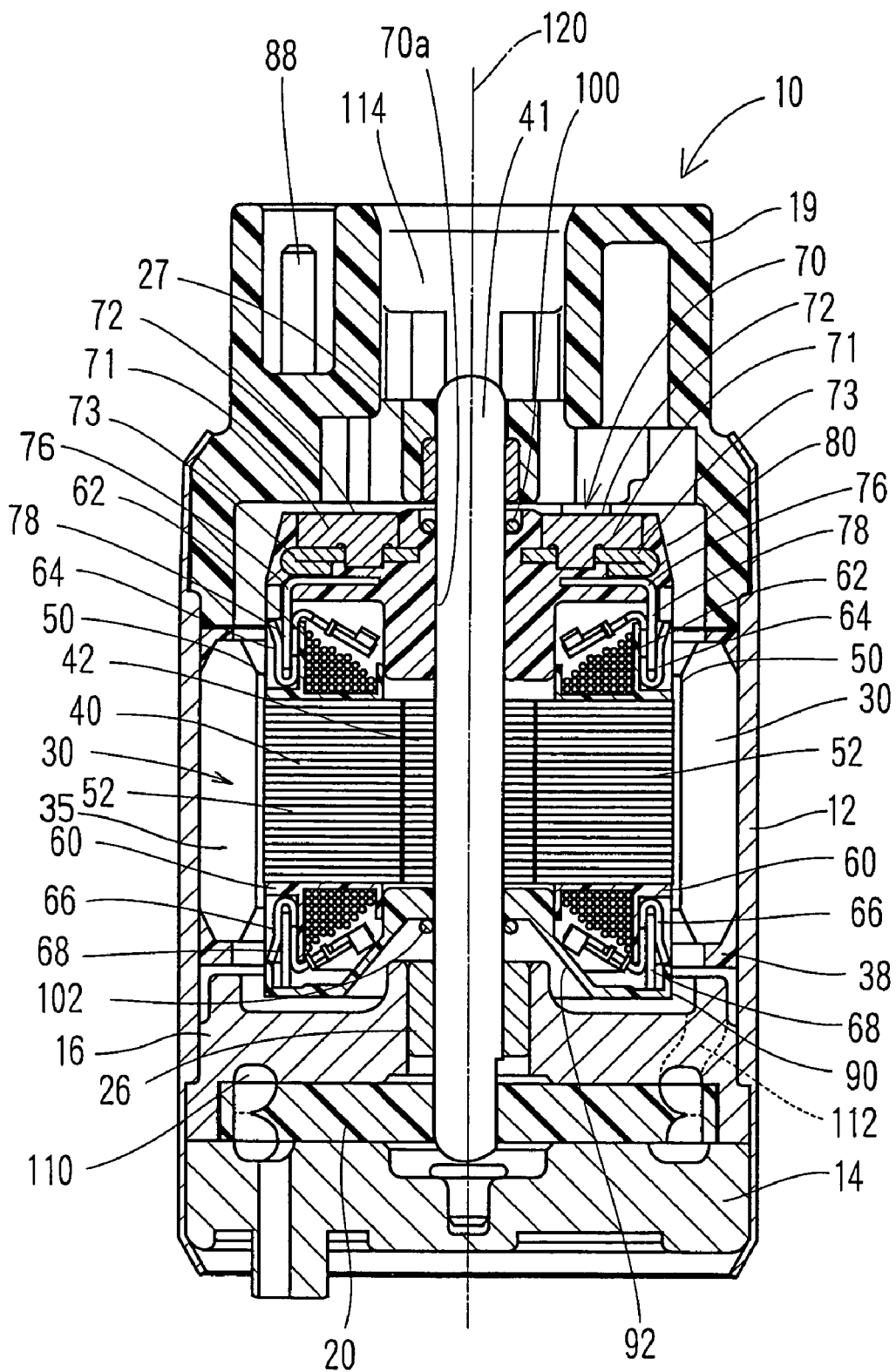
FIG. 2 is a longitudinal cross-sectional view of a fuel pump that includes the commutator shown in FIG. 1B.

For this purpose, a fuel pump 10 that includes a DC motor is shown in FIG. 2 as one of the rotary electric machine. The fuel pump 10 is an in-tank type pump which is disposed in a fuel tank of a vehicle. The fuel pump 10 includes a housing 12, an inlet side cover 14, a pump casing 16, an outlet side cover 19, an impeller 20 and a DC motor section 30. The pump casing 16 is disposed between the inlet side cover 14 and the housing 12. A C-shaped fuel passage 110 is formed between the inlet side cover 14 and the pump casing 16, where the disk shaped impeller 20 is accommodated. The pump casing 16 has a center hole to hold a bearing 26 therein. The disk shaped impeller 20 has a plurality of impeller ditches on the periphery thereof. The motor section 30 includes a plurality of permanent magnets 35, an armature 40, a brush unit (not shown) and a commutator 70. The permanent magnets are supported by the housing 12 via resinous members 38 to form magnetic poles The armature 40 has a rotary shaft 41, which is connected to the impeller 20.

When the armature 40 of the motor section 30 rotates the impeller 20, a pressure difference is generated due to a frictional force on the opposite sides of each impeller ditch, so that the fuel in the pump passage 110 can be pressured. Accordingly, the fuel in the pump passage 110 is discharged through a passage 112 that is formed in the pump casing 16 into the inside of the pump section 30. The discharged fuel flows around the armature 40 to cool the same and toward the commutator 70 and the outlet cover 19. Then, the fuel passes an outlet 114 formed in the outlet cover 19 to be injected into an engine.

The commutator 70 has six male terminals 76 and is fixed to an end of the armature 40. A cover 90 is fixed to the other end of the armature 40. The armature 40 includes a center core 42 and six coil units 50. The center core 42 has a center hole to which the rotary shaft 41 is force-fitted. Each coil unit 50 includes a coil core 52, a bobbin 60 and a coil 62. Each coil 62 is connected to a female terminal 64 that is disposed on the right side (in FIG. 2) of the armature 40 and to a female terminal 66 at portions inside the periphery thereof so that fuel can flow along the periphery without obstruction. The female terminals 64 are respectively coupled with the male terminals 76 by their nail 78 to electrically connect each other. Six female terminals 66 are divided into groups including neighboring three female terminals, which are coupled with three male terminals 68 to be electrically connected to each other.

The commutator 70 has a center through hole 70a to which the rotary shaft 41 is force-fitted. The nail 78 of each male terminal 76 bends at a portion inside the periphery of the commutator 70 and extends in the axial direction so as to couple with the female terminal 64. A C-shaped ring 100 is fitted to a recess of the rotary shaft 41 to hold the commutator 70 in the axial direction.

Figure 5A:
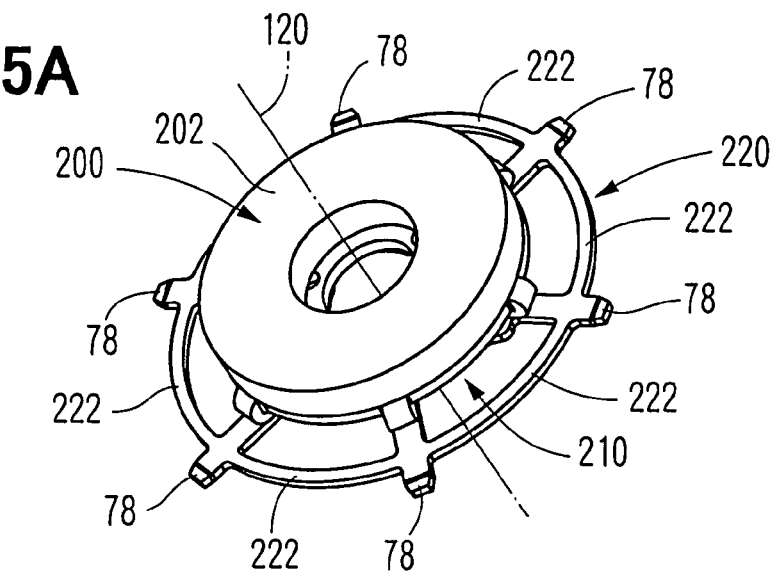
FIGS. 5A, 5B and 5C illustrate steps of manufacturing a second pre-commutator unit.
Figure 5B:
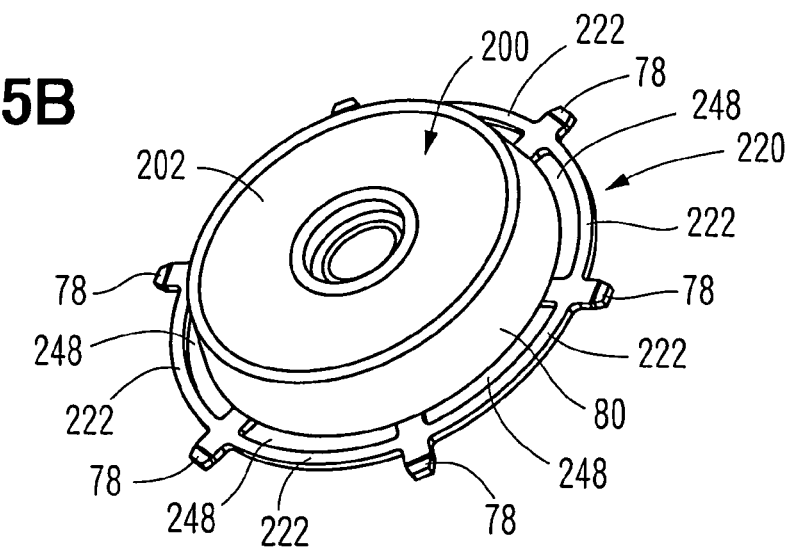
Figure 5C:
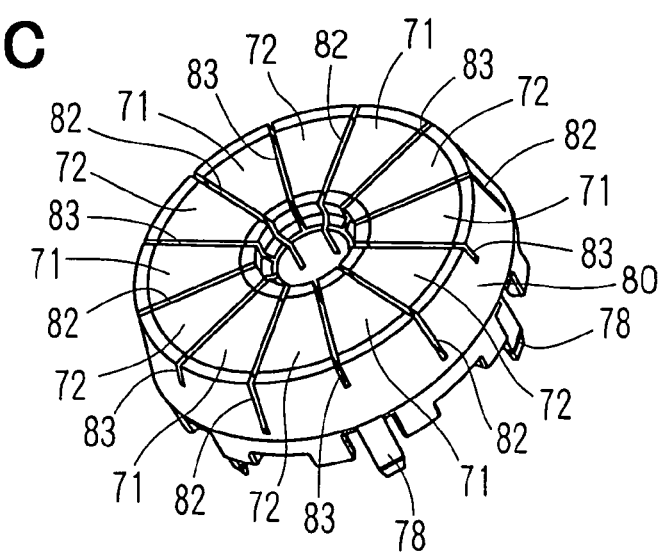

As shown in FIG. 5C, the commutator 70 has six commutator segments 71 aligned in the circumferential direction thereof. Each commutator segment 71 is made of carbon and is insulated from other commutator segments 71 by slits 82 and insulating resinous members 80. The commutator segments 71 may be made of copper or other conductive material. Each segment 71 has a shallow slit 83 that is formed to remove a film of fuel. The commutator 70 also has a metal plate terminal unit that includes six intermediate connection members 73, first three terminal members 76 and second three terminal members 77. The commutator segments 71 and the terminal unit are molded with insulating resin, which forms the resinous member 80.

Each intermediate connection member 73 directly contacts one of the commutator segments 71, and each one of the first and second terminal members 76, 77 is connected to one of the commutator segments 71 via one of the intermediate connection members 73. Each second terminal member 77, which is connected to one of the intermediate connection members 73 on one side, has a semi-spiral connection arm 77b that connects another intermediate connection member 73 on the other side in the radial direction.

The outlet cover 19 has a terminal pin 88, which is connected to the brush unit, which has brushes in contact with the flat front surface of the commutator 70. Therefore, electric power is supplied to the coils 62 of the armature 40 from the brush unit via the intermediate connection members 73, the first and second terminal members 76, 77, so that the armature 40 and the commutator 70 rotates.

As shown in FIG. 2, the cover 90 is disposed at an end of the armature 40 remote from the commutator 70 to provide a smooth surface which can reduce rotation resistance of fuel when the armature rotates in the fuel. The cover has a center recess 92 in which the bearing 26 and the a front projecting portion of the pump casing 16 are accommodated. A C-ring 102 is fitted to a groove of the shaft 40 to fix the cover 90 and the shaft 41 together.

Figure 3:
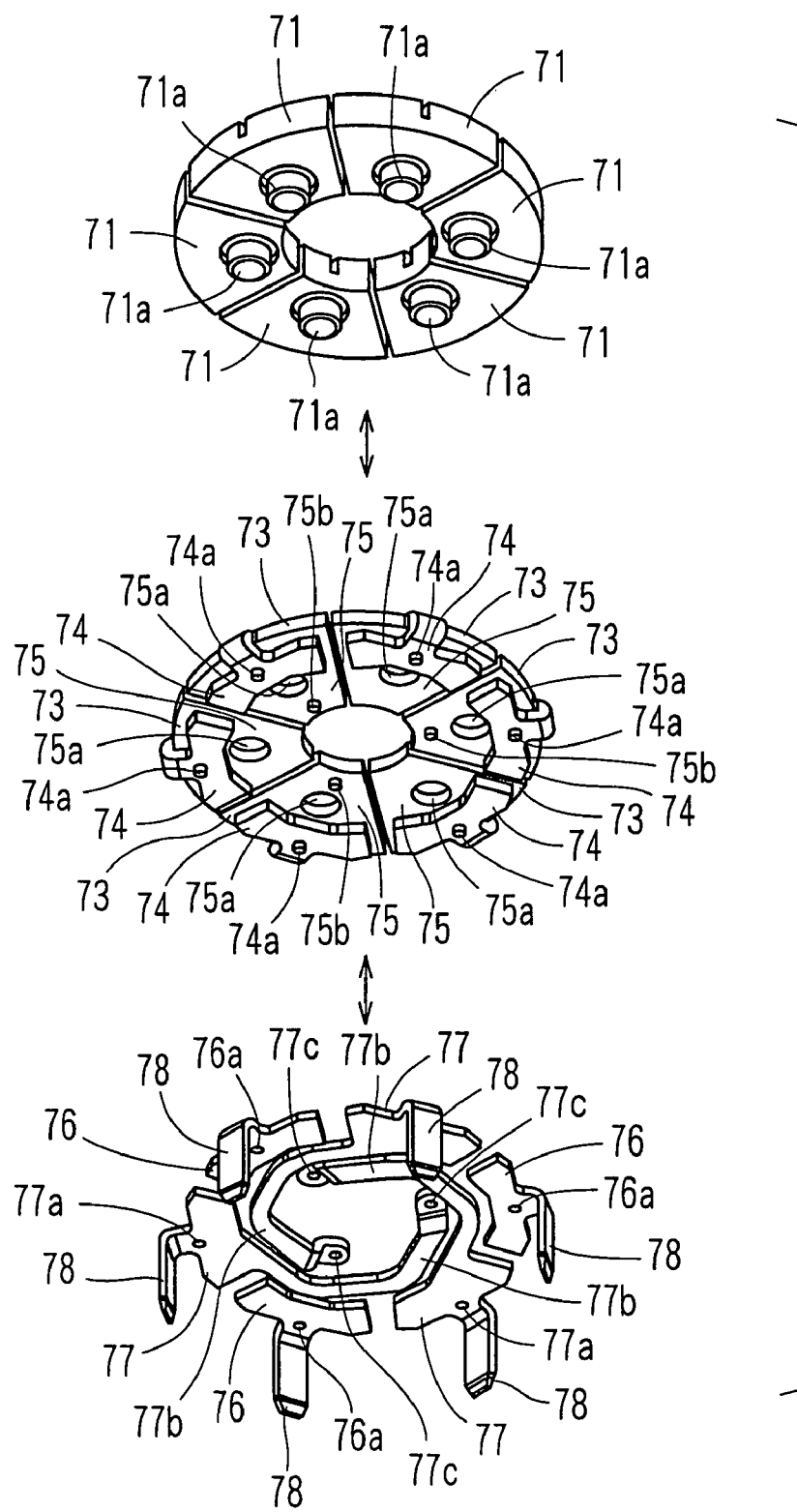
FIG. 3 is an exploded view of the pre-commutator unit shown in FIG. 1A.

As shown in FIG. 3B, each intermediate connection member 73 has a fan shaped base portion 75 and an axially projecting contact portion 74 at the rear of the base portion 75. The three first terminal members 76 and the three second terminal members 77 are disposed in the same plane and alternately contacts the contact portions 74 of the six intermediate connection members 73. The three first terminal members 76 and the three second terminal members 77 respectively have the nails 78, as described above. Each second terminal member 77 has one of the semi-spiral connection arms 77b Each connection arm 77b has a fixing hole 77c at an end thereof, which bends toward the base portion 75 of one of the intermediate connection members 73 so that the base portion 75 can be connected by means of a projection 75b without contacting the base portions 75 of other connection members 73. The connection arm 77b also extends in a spiral shape so that it may not contact the inner surfaces of the contact portions 74 of the intermediate connection members 73. Accordingly, each pair of the base portions 75 that is disposed at opposite sides in the radial direction is electrically connected and insulated from other base portions.

As shown in FIGS. 3A and 3B, each commutator segment 71 has an axially projecting projection 71a at its rear surface, and each fan shaped base portion 75 of the intermediate connection member 73 has a through hole 75a to which one of the projections 71a is fitted. Each contact portion 74 of the intermediate connection members 73 has an axially projecting projection 74a at its rear surface, each first terminal members 76 has a through hole 76a, and each second terminal member 77 has a through hole 77a. The intermediate connection members 73, the first terminal members 76, and the second terminal members are fixed together when the projections 74a are respectively fitted to the through holes 76a, 77a.

A method of manufacturing the commutator 70 according to the preferred embodiment of the invention will be described with reference to FIGS. 4A–9B.

Figure 4A:
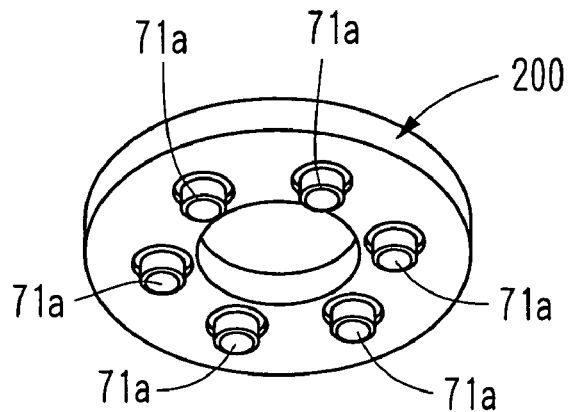
FIGS. 4A, 4B and 4C illustrate steps of manufacturing a first pre-commutator unit.
Figure 4B:
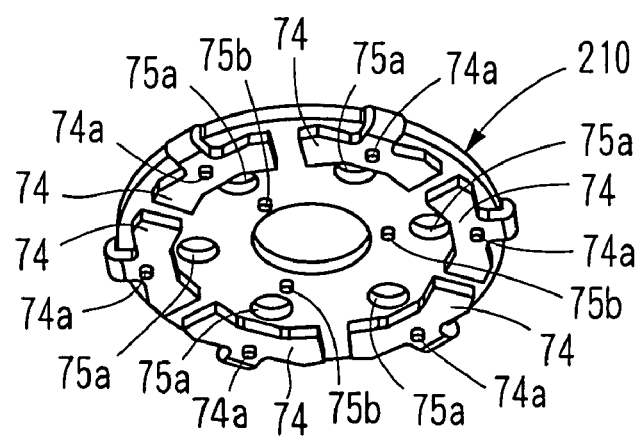
Figure 4C:
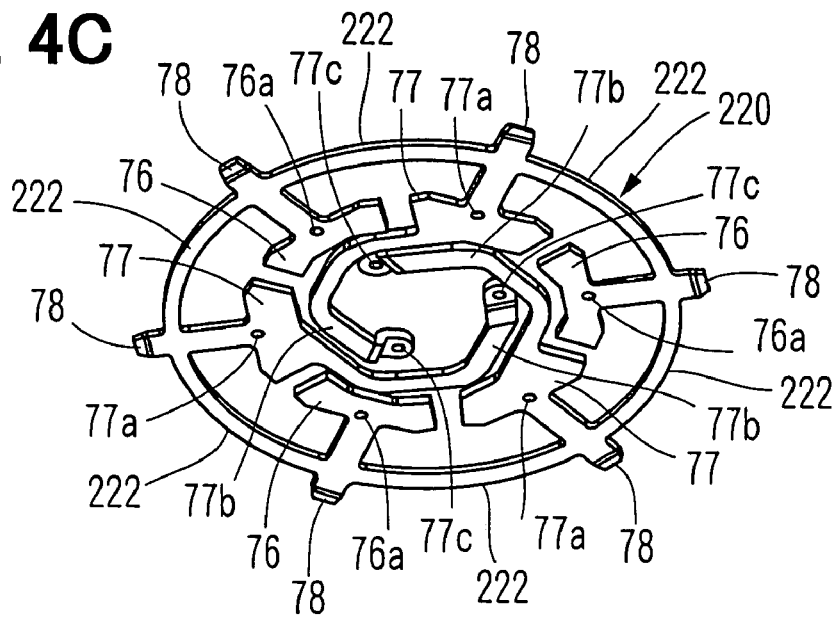

As shown in FIGS. 4A–4C, a unitary material 200 for a set of commutator segments 71, a unitary material 210 for the intermediate connection member 73 and a unitary material 220 for a set of the first and second terminal members 76, 77 are formed. The projections 71a are formed in the unitary material 200. The contact portions 74 with the projections 74a are separately formed in the unitary material 210, while the base portions 75 are not separated. However, the projections 75b are already formed. Flat and continuous shapes of the first and second terminal members 76, 77 with the through holes 76a, 77a, 77c are formed in the unitary material 220. The first and the second terminal members 76, 77 are connected to each other by arc-shaped members 222.

Then, the unitary materials 200, 210 and 220 are fixed to each other to provide a first pre-commutator unit shown in FIG. 5A. At this step, the projections 71a of the commutator segment 70 are respectively fitted to the through holes 75a, the projections 74a of the contact portions 74 are respectively fitted to the through holes 76a, 77a of the first and second terminal members 76, 77, and the projections 75b of the base portion 75 are fitted to the through holes 77c of the connecting arms 77b. Therefore, the nails 78 extend outward in radial directions.

Figure 6A:
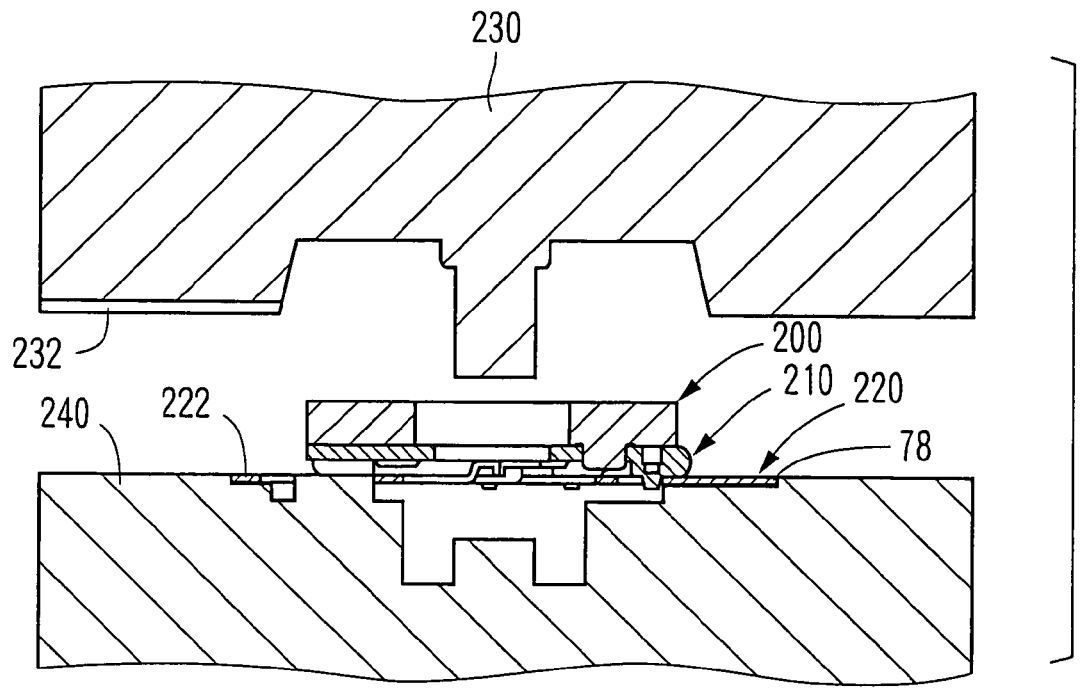
FIGS. 6A and 6B illustrate steps of manufacturing the first pre-commutator.
Figure 6B:
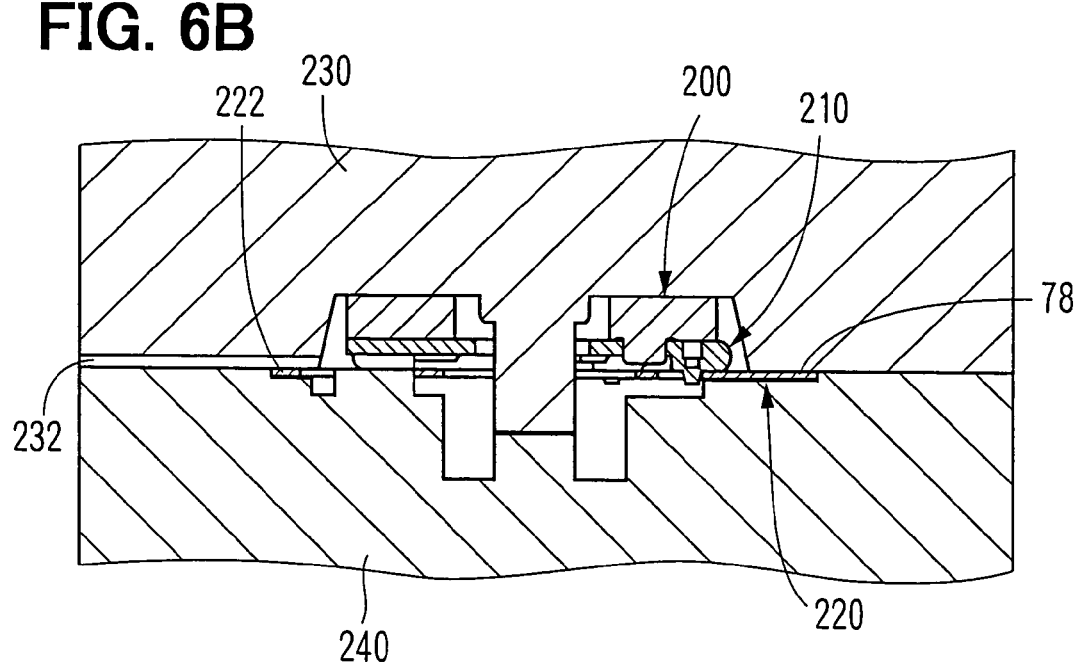

Thereafter, the pre-commutator unit including the unitary materials 200, 210, 220 is put between an upper die 230 and a lower die 240, as shown in FIG. 6A and held thereby, as shown in FIG. 6B, without a substantial gap except a groove 232 that is formed on the surface of the upper die 230 to charge liquid resinous material.

It is possible to put the first pre-commutator unit between the die 230 and the die 240 after the commutator segments 71 are separated.

Figure 7A:
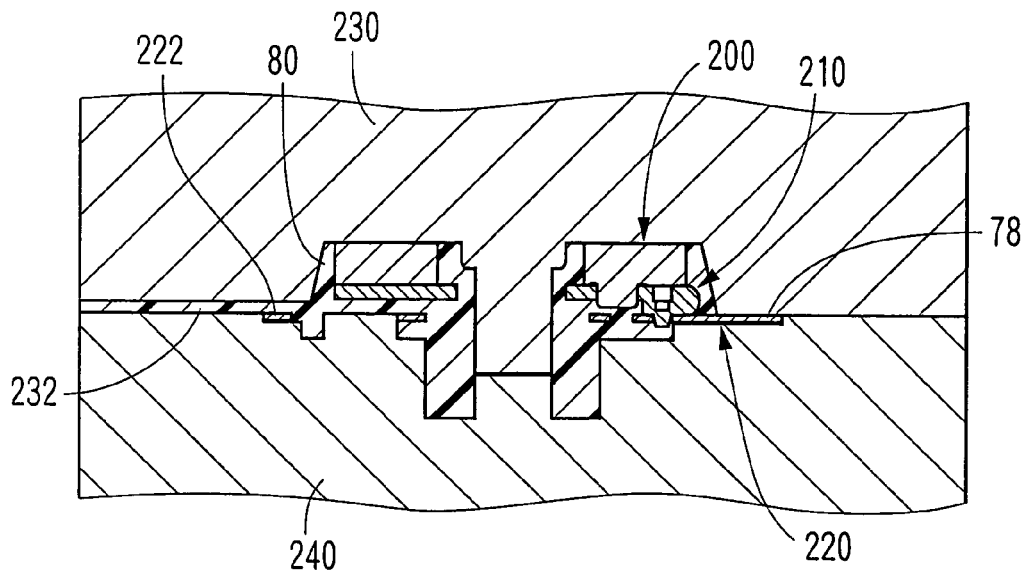
FIGS. 7A and 7B illustrate steps of manufacturing the second pre-commutator.

As shown in FIG. 7A, a resinous material is charged into the inside of the dies 230, 240. Although a portion of the resinous material enters a space 248 (FIG. 5B) formed inside the arc-shaped member 222 along the groove 232, the resinous material does not stick to the nails 78 because they are held by the upper and lower dies 230, 240 without a substantial gap.

Figure 7B:
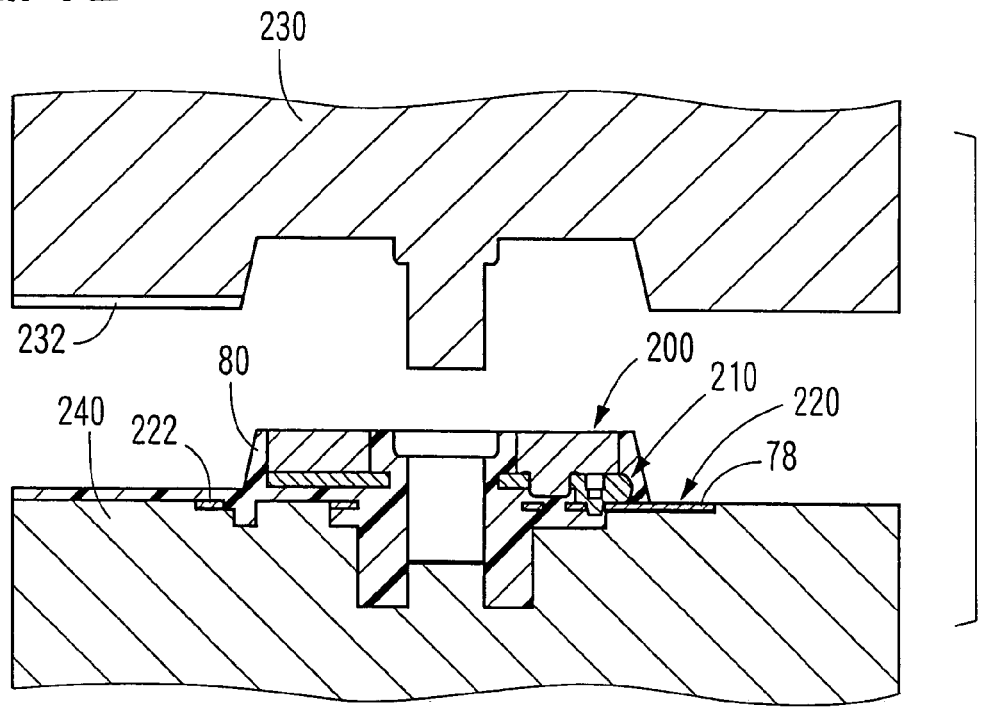

When the liquid resinous material becomes solid, the upper and lower dies are separated, as shown in FIG. 7B, so that a second pre-commutator unit shown in FIG. 5B is taken out from the dies 230, 240.

A pair of dies 230, 240 for molding a plurality of pre-commutator segments can be provided according to the above description.

Figure 8A:
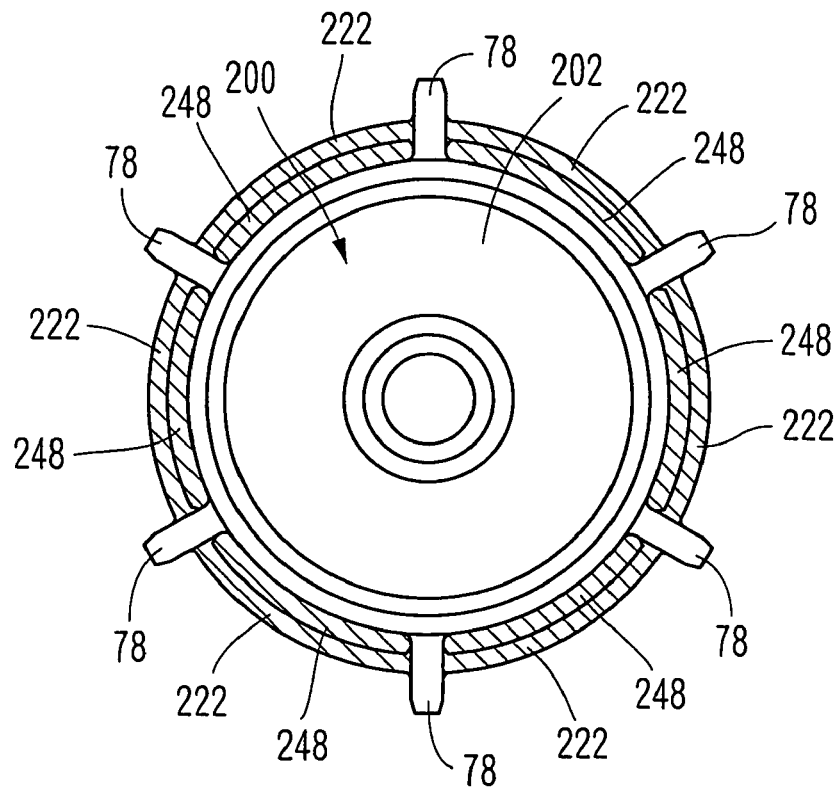
FIGS. 8A and 8B illustrate steps of manufacturing the second pre-commutator unit.
Figure 8B:
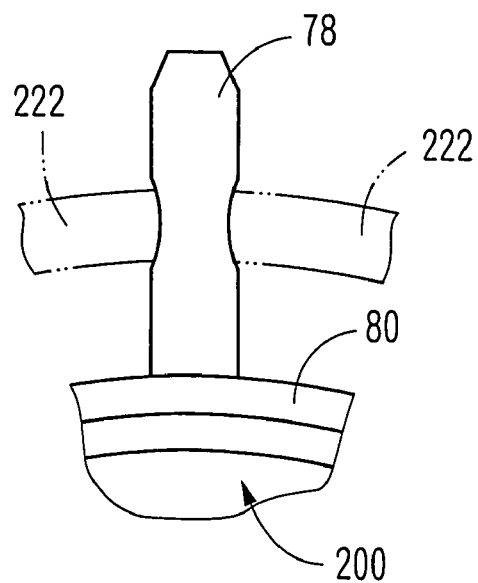

As shown in FIGS. 8A and 8B, hatched portions that include the arc-shaped members 222 and excessive portions of the solidified resinous material are removed by a punch or the like. It is effective to prevent a portion of the arc-shaped member from obtruding if portions of the nail 78 are cut together with the arc-shaped members, as shown in FIG. 8B.

Figure 9A:
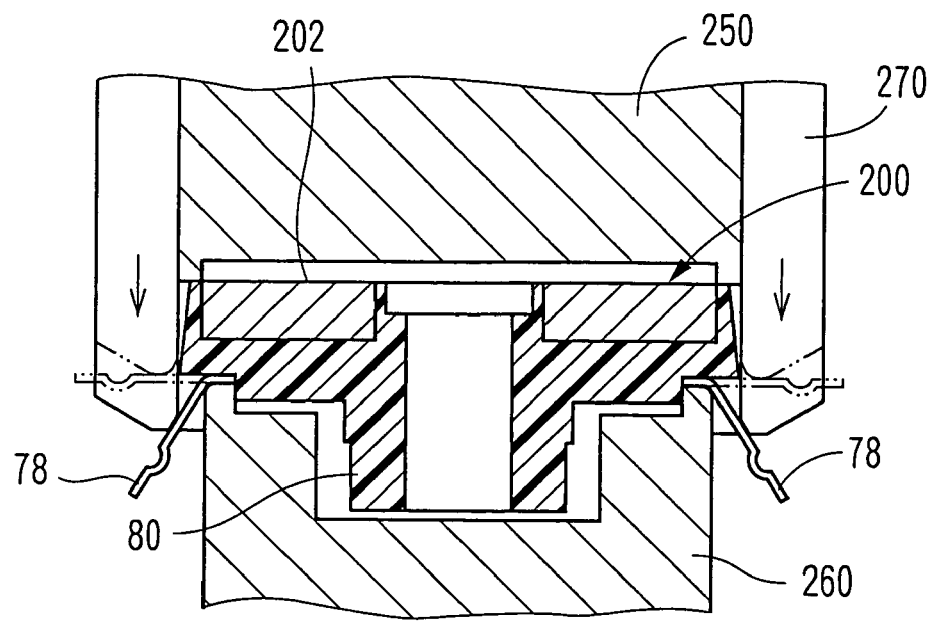
FIGS. 9A and 9B illustrate final steps of manufacturing the commutator.
Figure 9B:
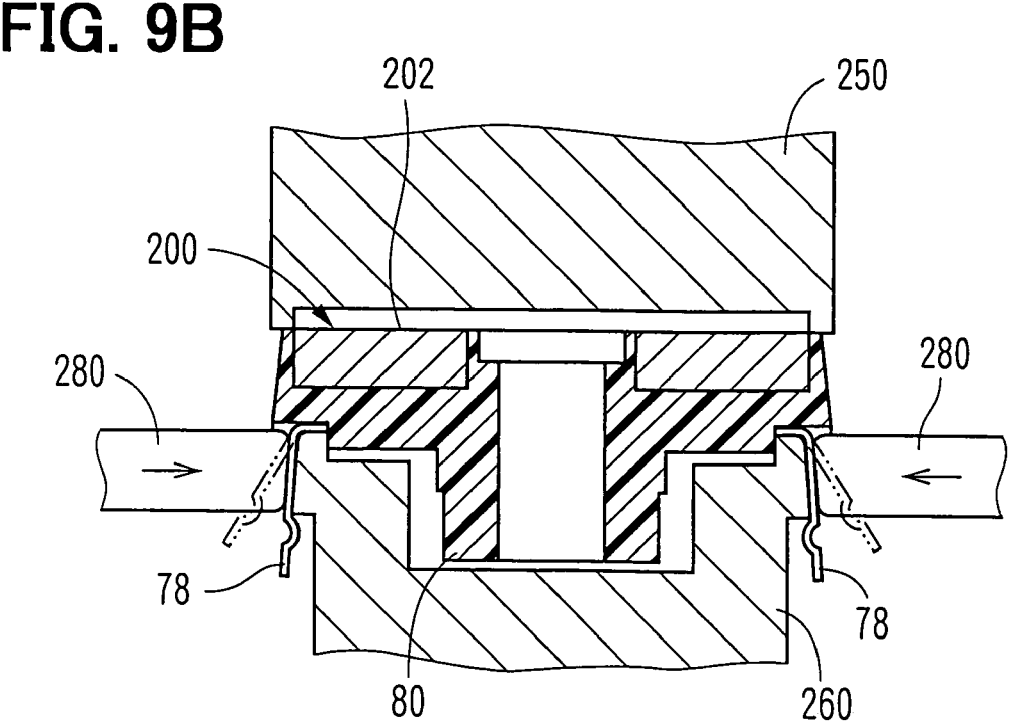

Thereafter, the second pre-commutator unit is put between a support die 250 and a base die 260. The support die 250 has an approximately the same outside diameter as the insulating resinous member 80 and supports the pre-commutator unit by a commutator surface 202 of the unitary material 200. The base die 260 has a smaller outside diameter than the insulating resinous member 80. A cylindrical punch 270 is slidably disposed around the support die 250. The punch 270 bends the nails 78 by an angle of about 60 degrees when the punch moves downward, as shown in FIG. 9A. Because the outside diameter of the base die 260 is smaller than the insulating resinous member 80, the bent portions of the nails 78 stay within the outside diameter of the resinous material 80. Thereafter, a punch 280 pushes the nails from radially outside to further bend the nails 78, as shown in FIG. 9B. As a result, the nails 78 stay within the periphery of the insulating resinous member 80 of the commutator 70, so that the nails 78 can readily fit into the female terminals 64 that extends from the armature 40, as shown in FIG. 2.

Thereafter, the slits 82 and 83 are formed in the unitary material 200. The slits 82 extend from the commutator surface 202 to the base portions 75 of the intermediate connection member 73, thereby dividing the unitary material 200 into six commutator segments 71, as shown in FIG. 5C. At this step, the front surface 72 of the commutator segments 71 are polished. The commutator segments 71 may have the commutator surface at the side thereof instead of the front surface.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. A method of manufacturing a commutator of a rotary electric machine which includes a plurality of commutator segments, a plurality of metal terminal members each of which has a nail to be connected to one of armature coils of the rotary electric machine, an insulating resinous member which supports the commutator segments and the metal terminal member, said method comprising:

a step of forming a first unitary material having nail portions for the plurality of metal terminals and a plurality of arc-shaped members connecting the nail portions at radially inside portions thereof, said first unitary material being flat with the nails extending radially outward;

a step of forming a second unitary material for the commutator segments;

a step of fixing the first unitary material and the second unitary material together to form a pre-commutator unit so that the nails extend radially outward from the periphery of the pre-commutator unit;

a step of inserting the pre-commutator unit between a pair of dies so that the dies hold the nails without a substantial gap; and a step of charging liquid resinous material into the radial inside of the arc-shaped members in the dies to mold the pre-commutator unit, whereby the arc-shaped members are disposed radially outside an outer periphery of the resinous material of the pre-commutator unit.

2. The method as claimed in claim 1, further comprising a step of bending the nails to stay within the periphery of the pre-commutator unit.

3. The method as claimed in claim 1, wherein said first unitary material comprises a plurality of terminal members, and the plurality of arc-shaped members respectively connect the terminal members.

4. The method as claimed in claim 3, further comprising a step of removing the arc-shaped members.

5. The method as claimed in claim 4, wherein the arc-shaped members are removed substantially in the absence of severing the resin of the pre-commutator unit.

6. The method as claimed in claim 3, wherein the plurality of terminal members integrally include said respective nail portions.

7. The method as claimed in claim 1, wherein said step of forming the first unitary material comprises a step of forming terminal members that has the nails and a step of forming an intermediate connection member to be disposed between the second unitary material and the terminal members.

8. A method of manufacturing a commutator of a rotary electric machine which includes a plurality of commutator segments, a plurality of metal terminal members each of which has a nail to be electrically connected to one of armature coils of the rotary electric machine, an insulating resinous member which supports the commutator segments and the metal terminal member, said method comprising:

a step of forming a first unitary material having nail portions for the plurality of metal terminals and a plurality of arc-shaped members connecting the nail portions at radially inside portions thereof, said first unitary material being flat with the nails extending radially outward;

a step of forming a second unitary material for the commutator segments;

a step of fixing the first unitary material and the second unitary material together to form a pre-commutator unit so that the nails extend radially outward from the periphery of the pre-commutator unit;

a step of sandwiching the pre-commutator unit between a pair of dies without a substantial gap; and a step of charging liquid resinous material into the radial inside of the arc-shaped members in the dies to mold the pre-commutator unit, whereby the arc-shaped members are disposed radially outside an outer periphery of the resinous material of the pre-commutator unit.

9. The method as claimed in claim 8, further comprising a step of bending the nails to stay within the periphery of the pre-commutator unit.

10. The method as claimed in claim 9, wherein said first unitary material comprises a plurality of terminal members, and the plurality of arc-shaped members respectively connect the terminal members.

11. The method as claimed in claim 10, further comprising a step of removing the arc-shaped members.

12. The method as claimed in claim 11, wherein the arc-shaped members are removed substantially in the absence of severing the resin of the pre-commutator unit.

13. The method as claimed in claim 10, wherein the plurality of terminal members integrally include said respective nail portions.

* * * * *